Patented Oct. 3, 1933

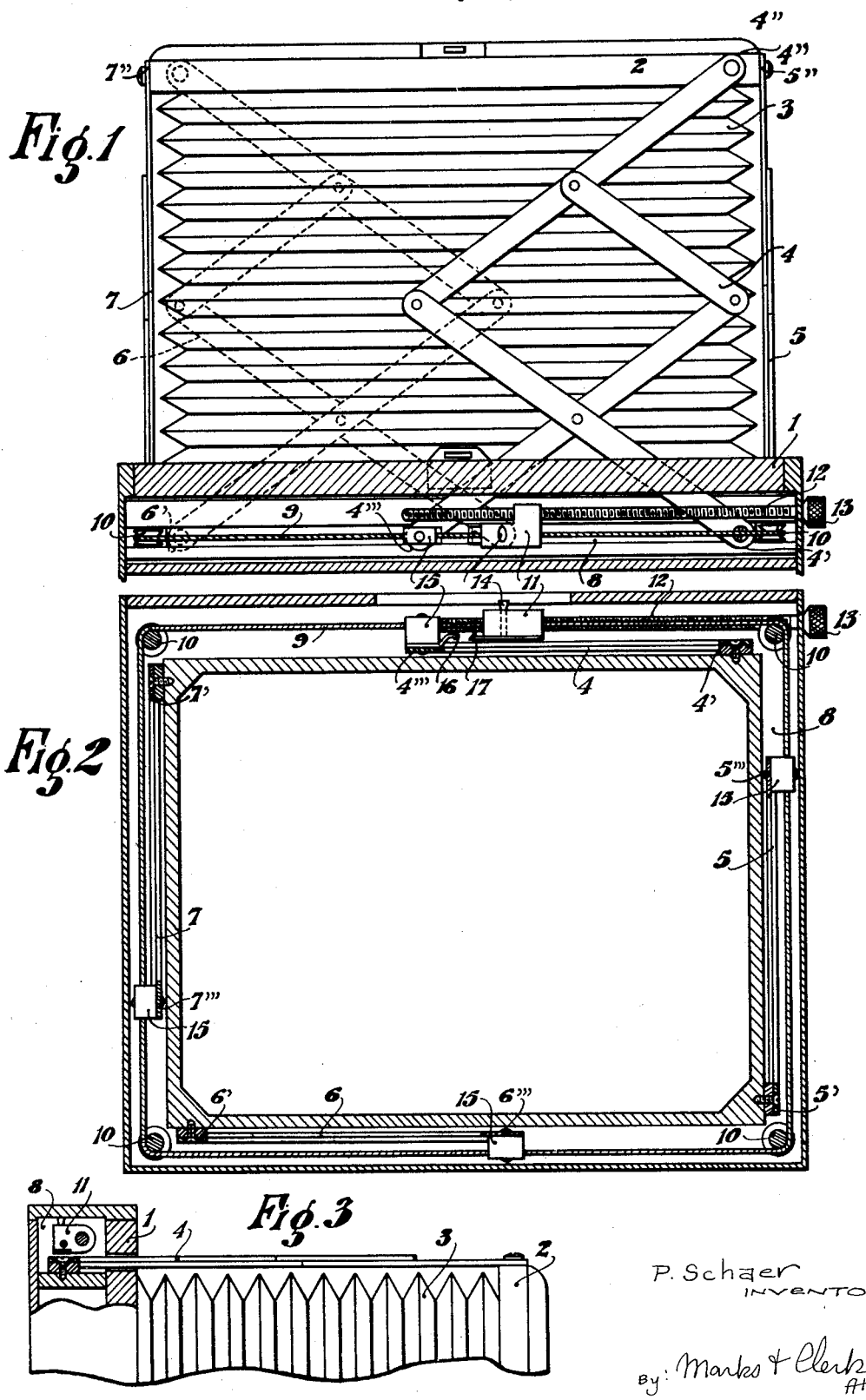

1,928,983

UNITED STATES PATENT OFFICE 1,928,983

PHOTOGRAPHIC CAMERA

Paul Schaer, Geneva, Switzerland

Application May 26, 1930, Serial No. 455,849, and in Switzerland August 26, 1929

5 Claims. (Cl. 95—39)

My invention relates to a photographic camera.

One of the objects of my invention is to provide a photographic camera wherein the sliding panel is attached to the body of the apparatus, by means of four pairs of lazy tongs and of collapsible, light-tight bellows.

A further object of my invention is to generally improve photographic cameras and instruments of the nature stated and render them more practical, reliable and commercially desirable.

In this specification and the annexed drawing I illustrate the invention in the form I consider the best, but it is to be understood that I do not limit myself to such form, because the invention may be embodied in other forms and applied to other uses, and it is also understood that in and by the claims following the specification I desire to cover the invention in whatever form it may be embodied and applied.

In the drawing:

Fig. 1 is a plan view of the camera with its lens panel extended and showing the camera body in section.

Fig. 2 is a vertical section through the body of the camera.

Fig. 3 is a fragmentary side view of the camera partly drawn in section.

In the camera illustrated, 1 is the body of the apparatus, 2 the lens panel and 3 the bellows. 4, 5, 6 and 7 are four similar pairs of Nuremberg shears or lazy tongs, having each the ends 4', 5', 6' and 7' of their first legs pivoted on one of the four corners of the body 1, their ends 4'', 5'', 6'' and 7'' registering on the corresponding corner of the lens panel 2 and the ends 4''', 5''', 6''' and 7''' of their second legs pivoted to blocks 15 sliding along a straight groove 8 cut in every side of the body 1. An endless cable 9, running on four pulleys 10, is attached to each of the four blocks 15 so that the latter are compelled to travel in full accordance with the shifting of the lens panel 2.

A driving attachment comprising a nut 11, moved along in either direction by a screw 12 which is housed within the body 1 and groove 8 and can be operated from the outside of the camera by means of the milled head 13, enables the focusing of the lens. On the nut 11, there is a flexible member 11' with a pusher 14. When the front of the apparatus is extended, the end 4''' slides along the groove 8 until a hook 16 carried by the block 15 engages with a catch 17 projecting from the member 11'; the camera is then in position for allowing the lens to be focused by slow operation of the screw 12.

The described camera can be easily and quickly brought into operating position, since the operator has but to pull out the lens panel 2; and owing to the provision of four pairs of lazy tongs, this lens panel is rigidly held in extended position.

I claim:

1. A photographic camera comprising a rectangular shaped camera body having four side walls, a lens panel, a bellows between body and lens panel, four pairs of lazy tongs, one pair of lazy tongs being connected to each of the four side walls of the camera body, each pair having two rear ends mounted on the camera body, one of said ends being rotatably secured to the body and the other end being slidable along one side wall, and an endless cable movable along the four side walls of the camera body and connected to the slidable rear end of each of the lazy tongs.

2. A photographic camera comprising a rectangular shaped camera body having four side walls, a lens panel, a bellows between body and lens panel, four pairs of lazy tongs, one pair of lazy tongs being connected to each of the four side walls of the camera body, each pair having two rear ends mounted on the camera body, one of said ends being rotatably secured to the body and the other end being rotatable along one side wall, an endless cable movable along the four side walls of the camera body and connected to the slidable rear end of each of the lazy tongs, and operating means for moving said cable to thereby impart motion to the lazy tongs for adjusting the lens panel.

3. A photographic camera comprising a rectangular shaped camera body having four side walls, a lens panel, a bellows between body and lens panel, four pairs of lazy tongs, one pair of lazy tongs being connected to each of the four side walls of the camera body, each pair having two rear ends mounted on the camera body, one of said ends being rotatably secured to the body and the other end being slidable along one side wall, an endless cable movable along the four side walls of the camera body and connected to the slidable rear end of each of the lazy tongs, a screw rotatably mounted in the camera body and extending along one of the side walls, and a nut movable along said screw and engageable with the slidable rear end of one of the lazy tongs.

4. A photographic camera comprising a rectangular shaped camera body having four side walls, a lens panel, a bellows between body and lens panel, four pairs of lazy tongs, one pair of lazy tongs being connected to each of the four side walls of the camera body, each pair having two rear ends mounted on the camera body, one of said ends being rotatably secured to the body and the other end being slidable along one side wall, and endless cable movable along the four side walls of the camera body and connected to the slidable rear end of each of the lazy tongs, a rear sight carrying arm hingedly mounted on one of the side walls of the camera body and adapted to be brought in upright position when using the camera or to be folded down on the side wall, and means on the slidable rear end of one of the lazy tongs to engage with said arm when in folded down position.

5. A photographic camera comprising a rectangular shaped camera body and a lens panel, a bellows between body and lens panel, said body having four side walls each provided with a groove extending along the wall, an endless cable adapted to move in said grooves, four pairs of lazy tongs supporting the lens panel, one pair of lazy tongs being connected to each of the four side walls of the camera body, each pair of lazy tongs having one rear end rotatably secured to the body and having a second rear end connected to said cable, and operating means to move said cable to thereby impart motion to the lazy tongs for adjusting the lens panel.

PAUL SCHAER.